United States Patent [19]

Petershack

[11] 4,114,467
[45] Sep. 19, 1978

[54] SNAP-ON WEAR PAD

[75] Inventor: Victor D. Petershack, Elm Grove, Wis.

[73] Assignee: Rexnord Inc., Milwaukee, Wis.

[21] Appl. No.: 746,762

[22] Filed: Dec. 2, 1976

[51] Int. Cl.² .................. F16G 13/02; F16G 15/00
[52] U.S. Cl. .................................. 74/255 R; 74/256; 308/238; 403/158
[58] Field of Search ............. 74/250 R, 245 R, 250 C, 74/255 R, 255 S, 256, 254, 247, 249, 251 R; 305/58 R, 57, 14; 308/237 R, 238; 403/151, 152, 158, 161, 162; 198/851

[56] References Cited

U.S. PATENT DOCUMENTS

| 564,030 | 7/1896 | Schwartz, Jr. | 74/249 |
| 586,956 | 7/1897 | Barker et al. | 74/251 R |
| 839,849 | 1/1907 | Horst | 74/255 |
| 2,757,051 | 7/1956 | Wilmer et al. | 308/238 |
| 3,192,785 | 7/1965 | Pearson | 74/255 R |

FOREIGN PATENT DOCUMENTS 301,478  6/1971  Bulgaria .................. 403/161

Primary Examiner—Samuel Scott
Assistant Examiner—William R. Henderson
Attorney, Agent, or Firm—Rexnord Inc.

[57] ABSTRACT

A snap-on wear pad is adapted to be used on conveyor chains. The wear pad includes a resilient, generally cylindrical body portion of a length adapted to fit between the opposite inner side bars of a conveyor chain. The body portion has an axial through hole and an axial entrance slot communicating with the through hole from the outer surface of the body, whereby the body can be snapped onto and resiliently held around the chain roller, bushing, or pin. The wear surface comprises an integral tab portion on the surface of the body opposite the entrance slot, providing an abrasive-resistant sliding surface and means to prevent rotation of the wear pad about the chain roller, bushing, or pin. An alternate construction comprises a composite two-piece wear pad assembly in which identical wear pad halves are similarly snapped onto the chain roller, bushing, or pin from opposite sides to provide a wear surface for both sides of the chain.

12 Claims, 7 Drawing Figures

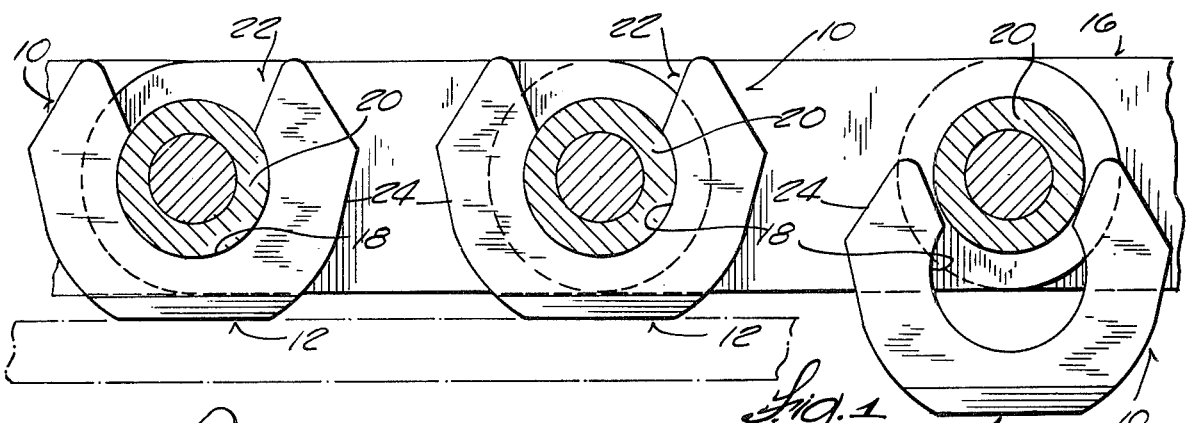
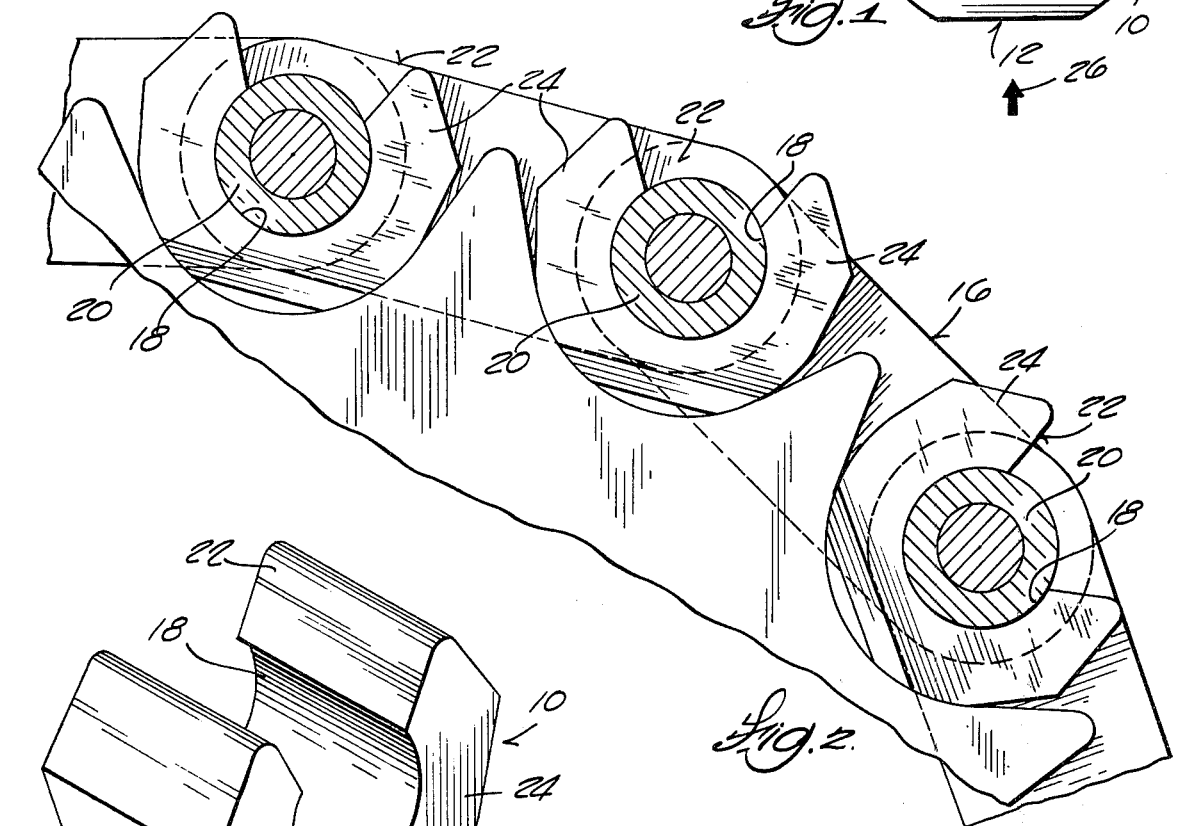
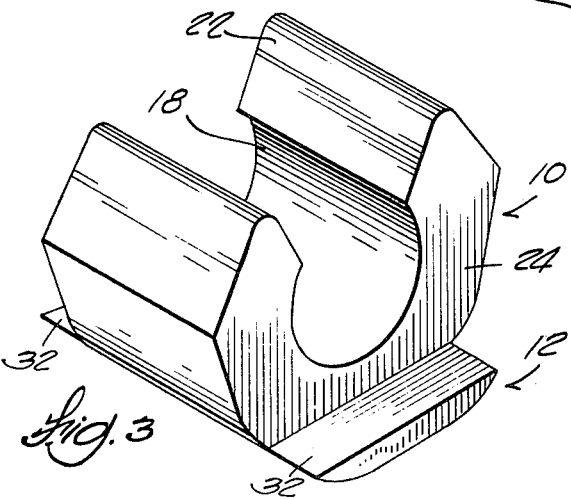
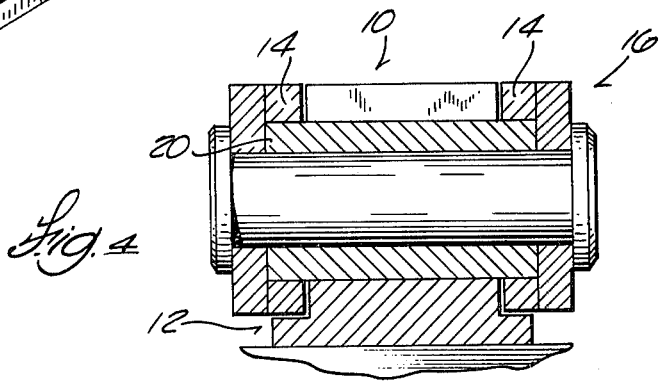

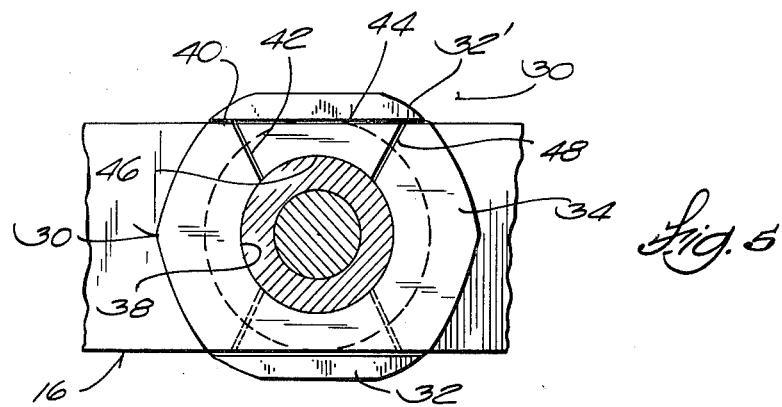
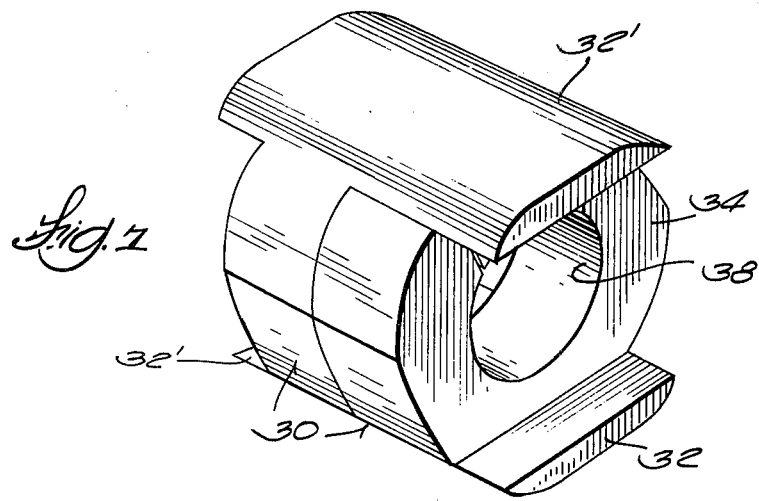
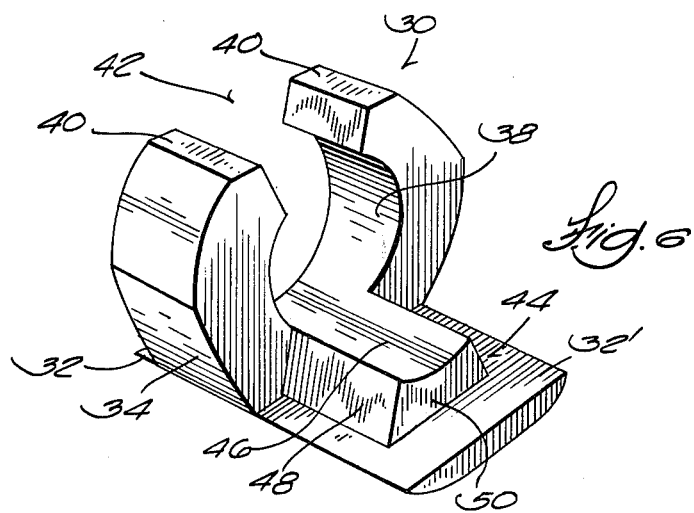

SNAP-ON WEAR PAD

FIELD OF THE INVENTION

This invention relates to chains which, during use, are dragged along surfaces, such as floors or worktable tops. Such chains are used, for instance, in automobile assembly lines in which subassemblies are placed directly on the chain or, where by use of chain attachments, a platform is formed and boxes and like items are moved.

BRIEF DESCRIPTION OF THE PRIOR ART

Chains of the class described are obviously subject to a great deal of wear, and various embodiments have been used to prevent or minimize such wear. Broadly speaking, these expedients fall into two categories: either the edges of the chain sidebars have been made of a wear-resistant and/or low-friction material or outsized bushings or rollers have been put on the chain pins, the diameter of the bushings or rollers having been large enough so that they, rather than the chain sidebars, have contacted the surface over which the chains have been dragged. However, the first expedient is expensive and does not prevent eventual failure of the chain, and the second expedient requires disassembly of the chain in order to replace worn-out bushings or rollers.

OBJECT OF THE INVENTION

The object of the invention is to provide an inexpensive, easily replaceable wear surface on chains of the class described, which wear surface, in particular, can be replaced without disassembling the chain.

SUMMARY OF THE INVENTION

Wear pads according to the subject invention comprise a main body portion which is in axial length approximately equal to the distance between the side bars of the conveyor chain on which the wear pad is to be used and at least one tab portion connected to the main body portion. The main body portion has an axial through hole which is more than semi-circular but less than circular in cross-section and which is sized and shaped to fit snugly around a chain bushing, roller, or pin on the conveyor chain and an at least generally radial entrance slot which leads from the outer surface to the axial through hole, which extends the axial length of the wear pad, and which is somewhat less wide than the diameter of the chain bushing, roller, or pin which is to fit into the axial hole. The tab portion is connected to the main body portion opposite to the entrance slot and extends axially outwardly from the main body portion at a distance beneath the axial hole just in excess of the distance from where the chain bushing, roller, or pin joins the sidebar of the conveyor chain to the edge of the sidebar, thereby preventing the wear pad from rotating about the chain bushing, roller, or pin. The wear pad is resilient about a plane passing through the entrance slot and the tab portion, which permits the pad to be forced onto and releasably held on the chain bushing, roller, or pin, and it is wear-resistant on the side opposite to the entrance slot, which portion acts as a wear surface during use of the wear pad. The portion of the wear pad which contacts the sprocket may be circular or may approximate the shape of the sprocket tooth pocket.

Alternately, a wear pad assembly of identical two-piece construction is provided in which the body portion of each piece is approximately half the axial length of the body portion of the construction of the preferred embodiment. Each piece has an axially extended tab portion to provide a substantially full chain width wear surface and, when the two halves are snapped onto the chain from opposite sides, the chain is equipped with wear surfaces on both sides. Integral stop means are provided on each wear pad half to fill the entrance slot of the other interfitting half, or to prevent axial displacement of the wear pad half along the bushing thereby allowing it to be used alone without the other half.

BRIEF DESCRIPTION OF THE DRAWINGS

FIG. 1 is a side sectional view of a chain having mounted thereon wear pads according to the subject invention, showing the chain being dragged over a surface and showing one of the wear pads being mounted on the chain.

FIG. 2 is a side sectional view of a chain having mounted thereon wear pads according to the subject invention, showing the chain passing around a sprocket wheel.

FIG. 3 is a perspective view of a wear pad according to the subject invention.

FIG. 4 is a front sectional view of a chain having mounted thereon a wear pad according to the subject invention.

FIG. 5 is a side sectional view of a chain having mounted thereon a two-piece wear pad assembly of an alternate construction.

FIG. 6 is a perspective view of one-half of the two-piece wear pad assembly of FIG. 6.

FIG. 7 is a perspective view of the two-piece wear pad assembly of FIG. 5.

DETAILED DESCRIPTION OF THE PREFERRED EMBODIMENTS

The invention is best described with reference to FIG. 3, which shows the presently preferred embodiment in perspective. As may be seen therein, the preferred embodiment comprises a main body portion 10 and two tab portions 12. As is best seen in FIG. 4, the main body portion 10 is in axial length approximately equal to the distance between the inner side bars 14 of the conveyor chain 16 on which the wear pad is to be used. The main body portion 10 has an axial through hole 18 which, as shown, is more than semicircular but less than circular in cross-section and which is sized and shaped to fit snugly around a chain bushing, roller, or pin, such as the bushing 20, on the conveyor chain 16. The main body portion 10 also has an at least generally radial entrance slot 22 which leads from the outer surface of the main body portion 10 to the axial through hole 18, which extends the axial length of the main body portion 10, and which is somewhat less wide than the diameter of the bushing 20. The tab portions 12 are connected to the main body portion 10 opposite to the entrance slot 22 and extend axially outwardly from the main body portion 10 at a distance beneath the center line of the axial hole 18 just slightly less than the thickness of the side bar 14, thereby preventing the wear pad from rotating about the bushing 20. The main body portion 10 is formed from a material permitting the wear pad to be resilient about a plane passing through the entrance slot 22 and the tab portions 12, allowing the wear pad to be forced onto and releasably held on the bushing 20, and the side of the wear pad opposite to the entrance slot is formed from a wear-resistant material, whereby the portion of the wear pad extending beyond the side bars 14 can act as a wear surface when the wear pad is dragged along a surface in the manner shown in FIGS. 1 and 4.

In most uses, the conveyor chain 16 will be formed into an endless loop and passed over two or more sprockets in order to change its direction and to provide drive power. In order to facilitate that construction, at least a portion of the radial surface 24 of the wear pad is preferably shaped to engage the teeth of a sprocket in the manner shown in FIG. 2.

The right-hand portion of FIG. 1 illustrates the manner in which the subject wear pad can be snapped onto the chain which it is to protect. Of course, the arrow 26 represents relative motion, not necessarily motion of the wear pad towards the bushing 20. This figure shows the wear pad in slightly distorted position as the bushing 20 is passed through the entrance slot 22. To facilitate such passing and to facilitate snapping the wear pad onto a chain bushing, roller, or pin, the entrance slot 22 is preferably flared outwardly as shown.

While the main body portion 10 and the tab portion 12 may be made as separate parts formed from different materials, and in some circumstances it would be preferable to so make them, in the presently preferred embodiment the entire wear pad is molded from a single piece of plastic which is both wear-resistant and resilient.

The primary function of the tab portions 12 is to prevent rotation of the main body portion 10 about the bushing 20, although of course they also serve as part of the wear surface in the illustrated embodiment. While two symmetrical tab portions 12 are shown in the drawings, it will be obvious that, in so far as their primary function is concerned, only one tab portion 12 is strictly necessary.

FIGS. 5 through 7 show an alternate embodiment wherein a two-piece wear pad assembly is used to provide a wear surface for both the upper and lower portions of the chain 16. In this manner, a chain equipped with wear pads on both surfaces of the chain can be inverted for use without the need to reverse the position of the snap-on wear pads. Such an inversion of the chain occurs automatically, of course, along the return run of the chain after it passes around the sprocket, and in this situation it is often desirable to also provide a wear surface for the chain as it travels along the return ways.

Thus, a two-piece wear pad assembly of identical interfitting halves is provided wherein each piece includes a main body portion 30 which is approximately half the axial length of the body 10 of the one-piece wear pad of FIGS. 1 - 4, or half the distance between opposite side bars 14 of the chain. The body portion 30 is similarly provided with an axial through hole 38, a radial entrance slot 42, and integrally attached tab portions 32 and 32'. In order to provide a wear pad of subtantially the width of the chain, tabs 32' are of considerably greater axial length than tabs 32. More precisely, tabs 32' are of a length equal to the axial length of the main body 30 plus an amount slightly less than the thickness of the side bar 14.

A pair of identical wear pad halves is snapped onto the bushing 20 in opposed interfitting relation such that the extended tab 32' of each piece overlies the outer ends 40 of the body portion 30 of the other piece adjacent the entrance slot 42. The composite two-piece wear pad assembly completely surrounds the chain bushing 20 and provides a full-width wear surface on both the top and bottom of the chain. The outer ends 40 of the body portion must be shortened, as compared to those of the single piece embodiment, so as not to extend past the edges of the sidebars and thereby interfere with the seating thereon of the extended tab 32' of the interfitting half. The ends 40 are also preferably flattened, as shown in FIGS. 5 and 6, to provide additional bearing surfaces for the abutting underside of the tab 32' of the other interfitting piece.

In the construction thusfar described, it will be appreciated that in the assembled condition, the entrance slots 42 remain open and present voids surrounded generally by inner surfaces of the interfitting wear pad halves and the chain side bar 14 and bushing 20, there being two such voids in each two-piece assembly. These open entrance slots are undesirable for a number of reasons. First, they provide recesses for the accumulation of dirt and other foreign materials which can eventually work their way into the chain joints and cause excessive wear. Also, there is no support for a substantial portion of the underside of extended tab 32' where it bridges the entrance slot between the supporting flattened ends 40. This is undesirable, particularly because these chains are often subject to heavy bearing loads in operation. And, finally, should one of the wear pad halves become dislodged accidentally or should it be desired to operate the chain with only one of the wear pad halves, such as where a wearing surface on only one side is needed or permitted, the single wear pad half would be unrestricted from movement axially along the bushing 20. Such movement would result in the end of tab 32' moving outwardly beyond the outside face of the inner side bar 14, whereby it would interfere with the articulation or relative movement between the inner and adjacent outer side bars. To eliminate all of the foregoing problems, there is provided a stop means 44 comprising a segmental extension of the annular body 30 along the underside or radial inner side of extended tab 32' and opposite the entrance slot 42. Stop means 44 is dimensioned to fill substantially the entrance slot 42 of the other interfitting wear pad half. Thus, it includes a semi-cylindrical surface extension 46 of the through hole 38, angled side faces 48 corresponding to the sides of entrance slot 42, and an end face 50 adapted to abut the inner surface of the side bar 14 when the wear pad body is snapped onto the bushing.

In order to provide a smooth sprocket tooth contacting surface in the two-piece wear pad assembly, the radial outer surface 34 of the body 30 is made symmetrical about its horizontal centerline, as best shown in FIG. 5. In this manner, the outer surfaces 34 of the oppositely attached, interfitting pieces provide the proper profile for sprocket tooth contact, regardless of the side from which the chain is driven.

What is claimed is:

1. A snap-on wear pad adapted to be used on a conveyor chain, said wear pad:
   (a) having a main body portion which is in axial length approximately equal to the distance between the side bars of the conveyor chain on which the wear pad is to be used;
   (b) having an axial hole clear through the main body portion which is more than semi-circular but less than circular in cross-section and which is sized and shaped to fit snugly around a chain bushing, roller, or pin of the conveyor chain on which the wear pad is to be used;

(c) having an at least generally radial entrance slot which leads from the outer surface of the main body portion of the wear pad to the axial through hole, which extends the axial length of the main body portion, and which is somewhat less wide than the diameter of the chain bushing, roller, or pin which is to fit into the axial hole;

(d) having a tab portion connected to the main body portion opposite to the entrance slot and extending axially outwardly therefrom at a distance beneath the center line of the axial hole not more than the thickness of the side bar, whereby the tab portion prevents the wear pad from rotating about the chain bushing, roller, or pin;

(e) being resilient about a plane passing through the entrance slot and the tab portion, whereby the wear pad can be forced onto and releasably held on the chain bushing, roller, or pin; and (f) being wear-resistant on the side opposite to the entrance slot, whereby the portion extending beyond the side bars of the chain during use acts as a wear surface.

2. A snap-on wear pad as recited in claim 1 wherein at least a portion of the radial surface of the wear pad is shaped to engage the teeth of a sprocket over which the conveyor chain is passed.

3. A snap-on wear pad as recited in claim 1, wherein the entrance slot is flared outwardly to facilitate snapping the wear pad onto the chain bushing, roller, or pin.

4. A snap-on wear pad as recited in claim 1 which is made from a single piece of plastic.

5. A snap-on wear pad as recited in claim 1 which comprises two such tabs, one of which projects from each axial side of the main body portion.

6. A snap-on wear pad adapted to be used on a conveyor chain comprising:

(a) a main body portion having an axial length of approximately half the distance between the side bars of the conveyor chain;

(b) an axial hole through the main body portion which is more than semi-circular but less than circular in cross-section and which is sized and shaped to fit snugly around the conveyor chain bushing;

(c) a generally radial entrance slot leading from the outer surface of the main body portion to the axial through hole, extending the axial length of the main body portion, and being narrower than the diameter of the bushing;

(d) an extended tab portion connected to the main body portion opposite to the entrance slot and extending axially outward therefrom a distance equal to the axial length of the main body plus an amount not more than the thickness of the side bar;

(e) the wear pad being resilient about a plane passing through the entrance slot and the tab portion, whereby the wear pad can be forced onto and releasably held on the chain bushing; and, (f) the wear pad having a radial outer surface opposite the entrance slot and extending beyond the chain side bars to provide a wear surface.

7. A snap-on pad as recited in claim 6 wherein an identical second wear pad is attached to the chain bushing in opposed interfitting relation to the wear pad to provide a two-piece wear pad assembly having wear surfaces on both sides of the chain.

8. A snap-on wear pad as recited in claim 6 comprising stop means connected to the radial inner surface of the tab portion and extending axially outward from the main body portion a distance equal to the axial length thereof and having an end face adapted to abut the side of the chain.

9. A wear pad assembly as recited in claim 7 wherein the radial outer surfaces of the interfitting body portions are shaped to provide a uniform surface for engagement by the teeth of a sprocket from either side of the chain.

10. A snap-on wear pad as recited in claim 7 including a second tab portion connected to the main body portion on the side thereof axially opposite the extended tab portion and extending axially outward from the body portion not more than the thickness of the side bar.

11. A wear pad assembly as recited in claim 7 wherein the stop means of each wear pad piece lies within and substantially fills the entrance slot of the other interfitting wear pad piece.

12. A snap-on wear pad adapted to be used on a conveyor chain comprising:

(a) a main body portion having an axial length not greater than the distance between the side bars of the conveyor chain;

(b) an axial hole through the main body portion which is less than circular in cross-section and which is sized and shaped to fit snugly around a bushing, roller, or pin of the conveyor chain;

(c) a generally radial entrance slot leading from the outer surface of the main body portion, extending the length of the main body portion, and being narrower than the diameter of the bushing, roller, or pin;

(d) a tab portion connected to the main body portion opposite to the entrance slot and extending axially outward therefrom a distance not greater than the sum of the distance between the side bars and the thickness of the side bar less the axial length of the main body portion;

(e) the wear pad being resilient about a plane passing through the entrance slot and the tab portion, whereby the wear pad can be forced onto and releasably held on the chain bushing, roller, or pin; and, (f) the wear pad having an outer surface opposite the entrance slot and extending beyond the chain side bars to provide a wear surface.

* * * * *